Figure 1:
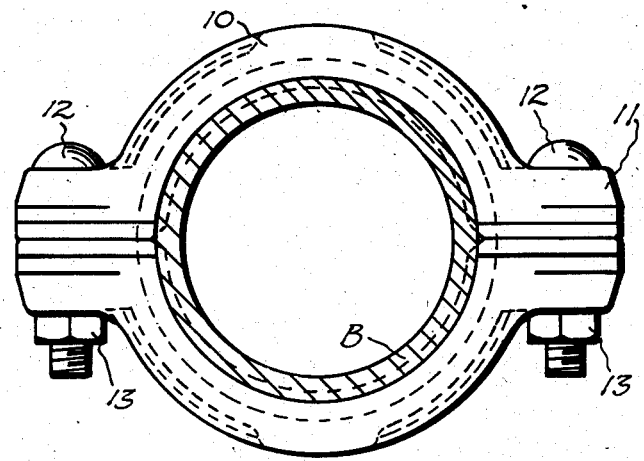

Jan. 21, 1936.  F. BARNICKOL, JR  2,028,182
COUPLING
Filed April 28, 1932  4 Sheets-Sheet 1

Inventor
Ferd Barnickol Jr.

Jack A. Ashley
Attorney

Jan. 21, 1936.　　　F. BARNICKOL, JR　　　2,028,182
COUPLING
Filed April 28, 1932　　　4 Sheets-Sheet 2

Inventor
Ferd Barnickol Jr.
By Jack A. Ashley
Attorney

Jan. 21, 1936.    F. BARNICKOL, JR    2,028,182
COUPLING
Filed April 28, 1932    4 Sheets-Sheet 3
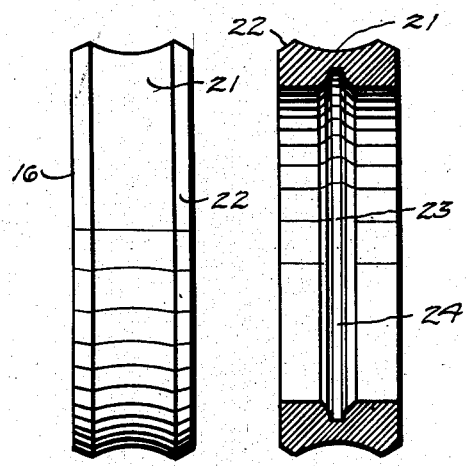
Fig. 11    Fig. 12
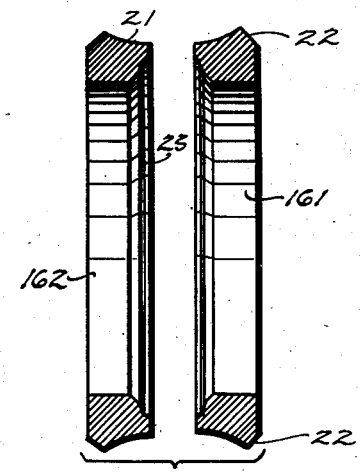
Fig. 19
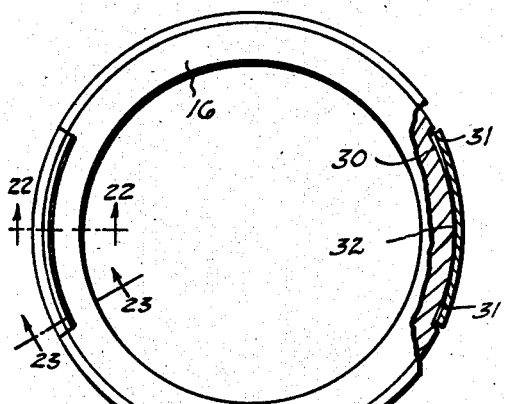
Fig. 20
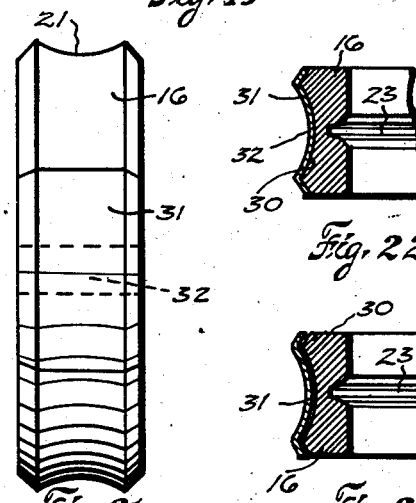
Fig. 21
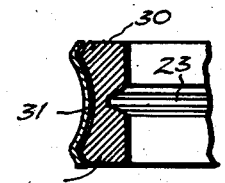
Fig. 22
Fig. 23
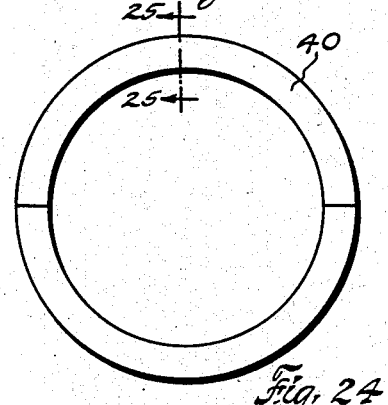
Fig. 24
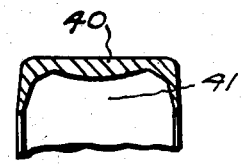
Fig. 25
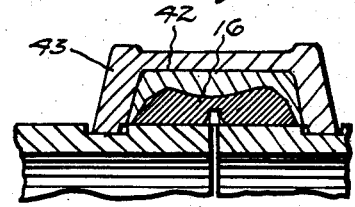
Fig. 26
Inventor
Ferd Barnickol Jr.
By Jack A. Schley
Attorney Jan. 21, 1936.  F. BARNICKOL, JR  2,028,182
COUPLING
Filed April 28, 1932   4 Sheets-Sheet 4

Inventor
Ferd Barnickol Jr.

By Jack A. Athley
Attorney

Patented Jan. 21, 1936

2,028,182

UNITED STATES PATENT OFFICE 2,028,182

COUPLING

Ferd Barnickol, Jr., Tulsa, Okla.

Application April 28, 1932, Serial No. 607,967

8 Claims. (Cl. 285—194)

This invention relates to new and useful improvements in couplings.

One object of the invention is to provide an improved coupling for tubular conductors such as pipes and the like.

A particular object of the invention is to provide an improved coupling including an elastic packing ring, or gasket, for surrounding the pipe ends, and a split metallic housing for exerting an external mechanical pressure applied radially to the gasket, whereby a constant seal between the gasket and the pipe ends is constantly maintained at all points on the circumferences of said pipes.

The advantage of this coupling is that it does not depend upon or utilize the pressure of the fluid, or commodity, flowing through the pipes, to expand or compress the gasket to form the seals. Certain commodities such as crude oil, gas, and the like are destructive to materials of organic origin such as rubber. Where internal pressure is employed the rubber or elastic gasket is not under sufficient pressure to prevent this destructive commodity from impregnating the same, but where the gasket is confined and more or less compressed as in the present invention it can not absorb, nor can destructive commodities impregnate said gasket, therefore, its useful life is indefinitely prolonged.

Another object of the invention is to provide an improved coupling for tubular members including a packing gasket and housing sections arranged so as to be clamped around the gasket and also to apply pressure thereto without injuring, pinching, or crimping the gasket. The advantage of this arrangement is that the gasket is permitted to flow or distort evenly, and the pressure is more equally distributed throughout said gasket.

Still another object of the invention is to provide a split housing including a plurality of substantially semi-circular members arranged so as to withstand distortion and yet to be constructed with a minimum amount of metal so as to conserve weight.

An important object of the invention is to provide a coupling comprising a solid elastic gasket having a smaller internal diameter than the pipe ends so as to form contact seals with the circumferential surfaces of said pipe ends when placed thereon; together with a split housing having an annular cavity for receiving the gasket, which cavity is not as deep as the thickness of the gasket but, is considerably wider than said gasket, whereby the gasket is deformed and spread upon the clamping of the housing and the cavity completely filled by the gasket, which causes the contact seals to be maintained and substantially increased. The advantage of such a coupling is that greater deflections from the alinement of the pipes may occur without breaking the seals. Also a gasket so distorted will not absorb or retain condensates from the fluid or gas passing through the coupling. Another advantage is that in case the coupling is subjected to a higher internal fluid pressure than its maximum capacity, the gasket seal will be broken to a sufficient extent to permit an ample leak, and thereby defeat destruction of the pipe ends. However, upon a reduction of such excessive internal pressure to within the range for which the coupling is designed, the seal will again become effective and further leaking prevented.

Another object of the invention is to provide an improved coupling comprising a housing having an internal annular rib and annular seats on each side of the rib, together with an annular packing gasket having a cavity for receiving the rib and shoulders for engaging the seats, whereby the gasket is more effectively held in contact with the pipe ends, and also whereby the gasket is deformed and spread along the surfaces of the pipe ends to provide maximum sealing contacts.

Still another object of the invention is to provide a gasket having an internal central annular groove arranged to facilitate the deforming of the gasket portions on each side thereof, and also to prevent the flow of the elastic material in between the ends of the pipes.

A construction designed to carry out the invention will be hereinafter described together with other features of the invention.

Figure 2:
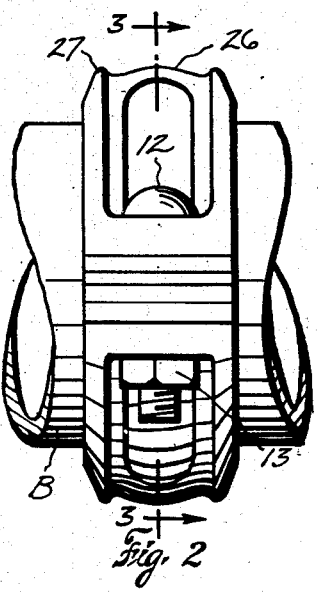
Figure 3:
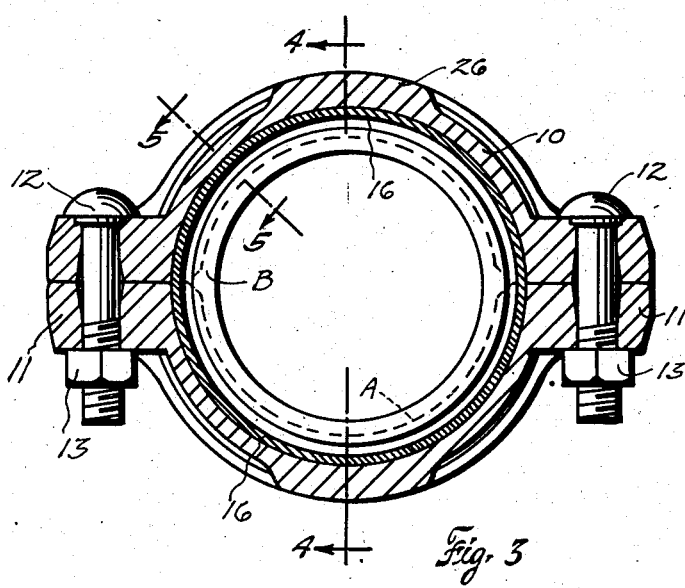
Figure 4:
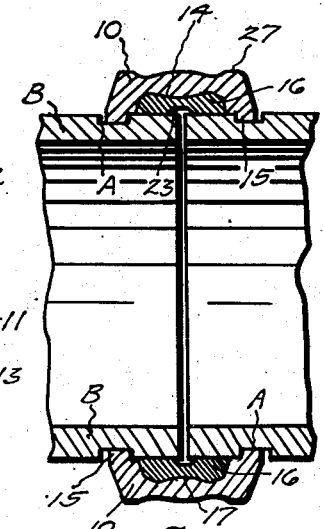
Figure 5:
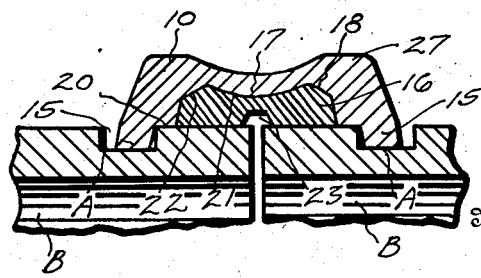
Figure 6:
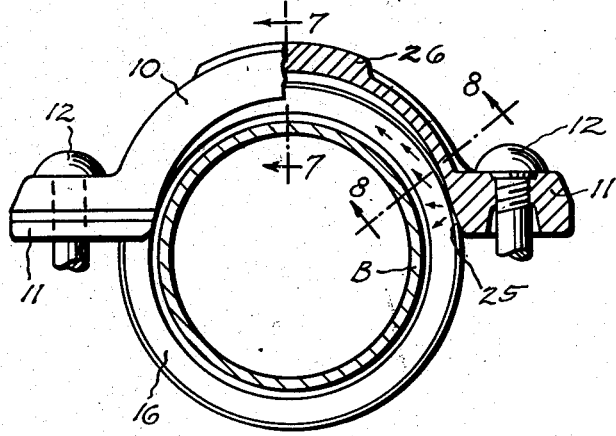
Figure 7:
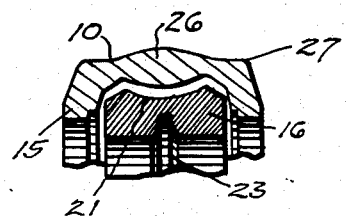
Figure 8:
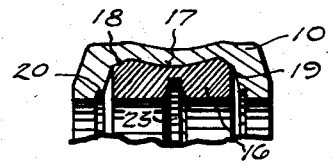
Figure 9:
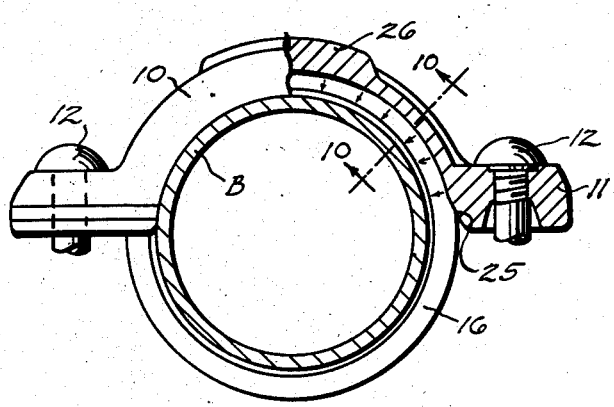
Figure 10:
Figure 27:
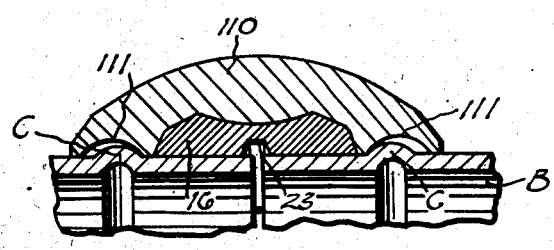
Figure 16:
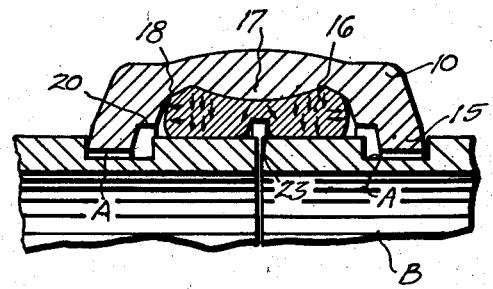
Figure 17:
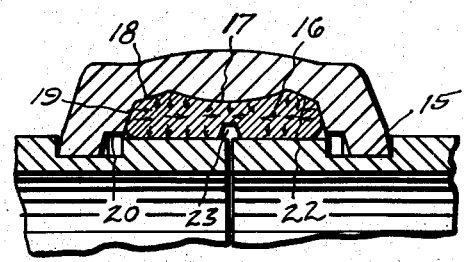
Figure 18:
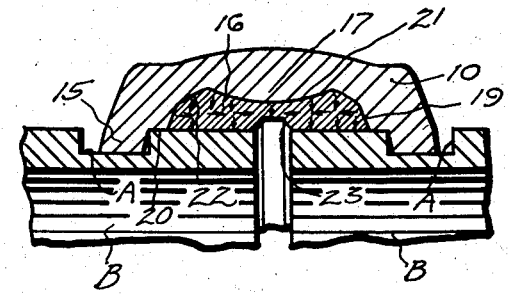

The invention will be more readily understood from a reading of the following specification and by reference to the accompanying drawings in which an example of the invention is shown, and wherein:

Figure 1 is an elevation of a coupling constructed in accordance with the invention and in position on a pipe line, which is shown in section, Figure 2 is a side elevation of the same, Figure 3 is a transverse vertical sectional view taken on the line 3—3 of Figure 2, Figure 4 is a vertical sectional view taken on the line 4—4 of Figure 3, Figure 5 is a transverse sectional view taken on the line 5—5 of Figure 3, Figure 6 is a detail showing one of the housing sections in its initial position on the gasket, Figure 7 is a cross-sectional view taken on the line 7—7 of Figure 6, Figure 8 is a sectional view taken on the line 8—8 of Figure 6, Figure 9 is a view similar to Figure 6 showing one of the housing sections in its final position on the gasket, Figure 10 is a transverse sectional view taken on the line 10—10 of Figure 9, Figure 11 is an elevation of the packing gasket, Figure 12 is a diametrical sectional view of the same, Figures 13 to 17 are transverse sectional views successively illustrating the progressive steps in the clamping of the housing and the deforming of the gasket, Figure 18 is a similar view showing the pipe ends fully contracted, Figure 19 is a diametrical sectional view showing a gasket formed of two sections, Figure 20 is a side elevation of a reinforced gasket, Figure 21 is a face view of the reinforced gasket, Figure 22 is a transverse sectional view taken on the line 22—22 of Figure 20, Figure 23 is a cross-sectional view taken on the line 23—23 of Figure 20, slightly exaggerated, Figure 24 is a side elevation of a converter ring, Figure 25 is a transverse sectional view taken on the line 25—25 of Figure 24, Figure 26 is a transverse sectional view showing the converter ring applied to an ordinary coupling housing for utilizing the gasket, and Figure 27 is a vertical sectional view similar to Figure 5 but showing a form of housing for use with pipe ends having ribs instead of grooves.

In the drawings the numeral 10 designates a metal housing composed of complementary semi-circular members each having diametrically opposite ears 11 for receiving bolts 12. Nuts 13 screwed onto the bolts are employed to draw the members together. The members are formed with an annular cavity 14 and marginal flanges or lips 15 on each side of the cavity.

The lips 15 are designed to engage in annular grooves A formed circumferentially in the ends of the pipes or tubular members B which are to be coupled. The grooves A are somewhat wider than the lips 15 so as to permit elongation and contraction of the pipes as well as a limited longitudinal play thereof when the housing is clamped on said pipes. In Figure 4, the pipe ends are adjacent, while in Figure 18, the pipe ends are shown as separated, and these two views illustrate the purpose of the wide grooves. It is common in the art to provide such lips and amplified grooves, and therefore, the invention is neither to be limited to such a structure nor is such a structure claimed as new and novel.

Figure 13:
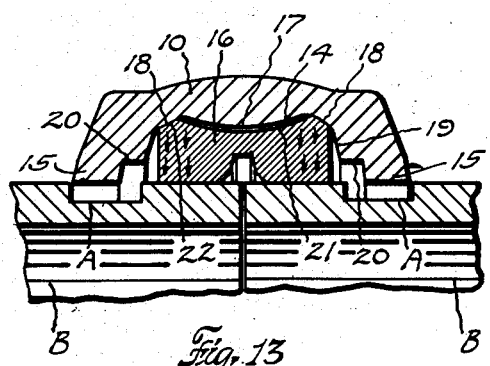

In the cavity 14 of the housing an annular gasket or packing ring 16 is received. This gasket is made of what is known to the trade as solid rubber, and may be formed of rubber, rubber compound, or any other material suitable for the purpose. As is shown in Figure 13, this gasket has a transverse width which is considerably less than the transverse width of the cavity 14. However, the gasket has a mean radial thickness which is greater than the depth of the cavity. This brings about a spreading or lateral expansion of the gasket when the housing members are drawn together.

To fully explain the novel features of the invention it will be necessary to describe the housing and the gasket in detail in order to bring out the particular co-action between the parts. As the members of the housing 10 are substantial duplicates, a description of one will explain both. At the center of the cavity 14 an annular boss or rib 17 is provided along the outer wall, and is transversely curved in a slight arc. This rib extends circumferentially between annular seats 18, which incline inwardly from the sides of the rib and connect said rib with the inclined or flaring side walls 19 of said cavity. Between the inner edges of the side walls 19 and the lips 15 annular shoulders 20 are formed on each side of the cavity. These shoulders have a slightly greater radii than the radii of the pipes B so that when the lips 15 engage in the groove A, a slight clearance will be left between the shoulders and the outer surfaces of the pipes.

The structure of the gasket 16 is very important. Referring to Figures 11 and 12, it will be seen that the gasket is provided with an outer circumferential concaved groove or face 21 bounded by beveled or inclined shoulders 22. The face 21 is curved transversely in an arc slightly greater than the arc of the rib 17, and consequently when the housing member first engages the gasket the shoulders 22 will contact with the seats 18 before the rib engages in the face 21, as will be apparent from an observation of Figure 13.

The gasket is given an internal diameter which is slightly less than the external diameter of the pipes B, and consequently when the gasket is engaged around the ends of said pipes, it will be slightly expanded, thus forming seals with the said pipe ends. The gasket is provided with an internal circumferential groove 23 which is substantially V-shaped in cross-section. This groove has a comparatively wide bottom 24 so as to provide a hinged section at the center of said gasket. When the gasket is placed around the pipe ends, as is shown in several of the figures, particularly 13 to 18 inclusive, the groove 23 straddles the gap between the ends of said pipes and prevents any portion of said ring from being caught or pinched between the pipes when the same are brought together. This groove further sufficiently reduces the radial thickness of the gasket to permit longitudinal movement of the pipes without breaking their contacts, or seals, established between the gasket and their outer surfaces.

It is very important that the housing members be clamped around the gasket without pinching or crimping said gasket between the ears 11. It is equally as important that mechanical pressure be applied externally and radially throughout all points of the housing when the latter is fully fastened around said gasket. When the gasket is engaged around the pipes B the mean radius of said gasket will be greater than the mean radius of the cavity 14 of the housing member. Therefore, when said housing member is first slipped down over the gasket, as is shown in Figure 6, the lower ends of the cavity 14 will engage on the gasket so that the upper portion of the housing member cavity will be supported some distance above said gasket. In order to ease the housing down onto the gasket and prevent crowding or pinching of said gasket, the ends of the cavity are flared or cut outwardly at 25, as is shown in Figures 6 and 9. When the nuts 13 are screwed up and the housing members drawn together, the flared portions will permit the rubber to flow in the direction of the arrows shown in Figure 6. When the housing is finally clamped together an equal radial pressure will be exerted as is indicated by the arrows in Figure 9.

The structure of the housing member is such that it will withstand the different strains to which it is subjected. In Figure 7 it will be noted that the arch or central section of the housing member is thickened by the provision of an external boss 26, which is also shown in Figures 3, 6 and 9. Between the boss 26 and the ears 11 the thickness of the housing is reduced as will be evident from Figures 6, 8, 9 and 10. The boss 26 at the center of the arch of the housing member provides a brace which tends to reinforce against strains, which would distort or spread the housing member. The reduced portions between the boss and the ears not only eliminate excess metal, but also permit the bolts to be set closer to the circumference of the pipes. The housing member is further reinforced by marginal beads 27 arranged on the exterior thereof.

Referring to Figures 13 to 17 inclusive, it will be noted that the gasket 16 is spread as the housing is tightened. When the gasket is placed over the pipe ends it is slightly expanded because its inner diameter is less than the outer diameter of each pipe. This causes seals with the pipe surfaces between the grooves 23 and the outer edges of the gasket. The gasket is applied either by placing it on the end of one pipe and then inserting the other pipe into the gasket, or by placing the gasket on one pipe so as to expose the end of said pipe, then after the other pipe is placed in position, sliding said gasket into the position shown in Figure 13. These original seals or contacts are very important and are maintained through the coupling operation.

Figure 14:
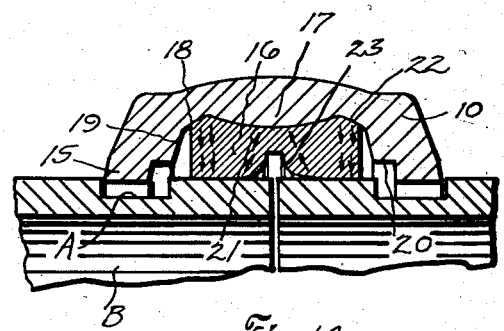

When the coupling member 10 is first placed in position the seats 18 will rest upon the shoulders 22 and pressure will be exerted in the direction of the arrows. The housing will be supported out of contact with the pipes B and the rib 17 will not engage in the concaved face 21 because of the difference in the arcs thereof. When pressure is applied by tightening the nuts 13 the shoulders 22 become fulcrum points, whereby the face 21 is swung outward to contact the rib 17 because of the inward pressure exerted on the inner marginal portions of the gasket, as is indicated in Figure 14.

Figure 15:
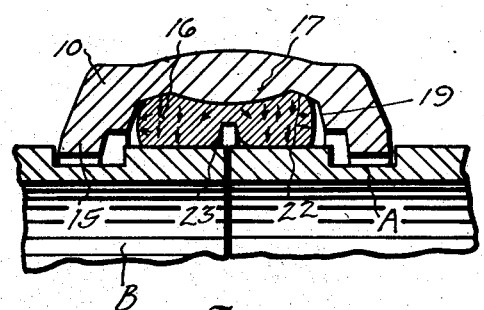

As the tightening of the housing progresses the gasket 16 is spread laterally and pressure is exerted as shown by the arrows in Figure 15. At this stage the rib 17 has begun to exert its inward radial pressure, and the contacts, or seals, have been reestablished. As the tightening progresses the gasket is still further spread as is indicated in Figure 16. It will be noted by observing the arrows that the rib 17 and the seats 18 are exerting an inward pressure, but the gasket is deforming laterally toward the side walls of the housing member. These side walls 19 are inclined but the inclination is more for facilitating the placing of the housing than for any other purpose. So long as these walls are normally spaced from the sides of the gasket the structure would be operative because it would allow the gasket to expand or deform laterally.

It will be observed that as the clamping or coupling action progresses the groove 23 is reduced and the seals or contacts are increased. The final position is shown in Figure 17. When this stage is reached not only are the rib 17 and seats 18 exerting radial inward pressure, but also the side walls 19 are resisting further expansion of the gasket, and thereby exerting transverse or lateral pressure as is indicated by the arrows.

As before stated the grooves A are somewhat wider than the lips 15 and this permits the pipe ends B to have relative movements. In Figure 17, the pipe ends are adjacent, while in Figure 18, the pipe ends have separated due to elongation or longitudinal movement. This is carried out without breaking the seals or contacts with the pipes and is possible because of the groove 23.

The invention, of course, contemplates variations and structures to suit particular conditions. In Figure 19, I have shown a gasket similar to the gasket 16 except that it is circumferentially cut into two equal sections 161 and 162, otherwise it is the same as is shown in Figures 11 and 12. This two piece or split gasket has certain advantages in that the pipe ends may be separated and the sections easily inserted therebetween. A further advantage is that a section is placed on each pipe end, and it is not necessary to ascertain whether or not the groove 23 is centered over the gap between the pipe ends as is the case where a one piece ring is used.

Figures 20 to 23 inclusive show another form of gasket wherein the same form is employed as in Figures 11 and 12 with the exception that recesses 30 are formed in the outer circumference of the gasket at diametrically opposite points. Guide plates 31 made of thin metal are mounted in these recesses and are shaped to conform to the contour of the gasket and to lie flush with the outer surface thereon. A particular feature is that these plates are fastened to the gasket only at their central or intermediate portions as is indicated at 32. This arrangement permits a free flowing or distorting movement of the elastic material under the end portions of said plates.

It will be obvious that this form of gasket will be placed in the housing 10 so that the plates will bridge over the joint between the members and to lie opposite the flared portions 25. The plates will reinforce and form supports for the ring. When these plates are used pinching or crimping of the ring will be avoided, and therefore, it would be possible to eliminate the flared portions 25. Should the housing open up between the ears 11 under abnormal strains these reinforcing plates 45 would prevent bursting or outward distortion of the gasket. In assembling, the housing member would engage on the plates and readily slide down the same without injuring the gasket, but the gasket would be free to deform or flow during such operation.

In order to use the gasket 16 in connection with an ordinary housing, I provide a liner or converter 40 (Figures 24, 25 and 26) having an inner contour 41 similar to the inner contour of the housing members 10. This liner is made in two pieces or sections as shown in Figure 24, and its outer surface is shaped to fit snugly in the cavity 42 of an ordinary coupling housing 43. Figure 26 shows the parts in coupled position.

It is obvious that various connections could be made between the housing members 10 and the pipes B. In Figure 27, I have shown the pipes B provided with circumferential beads C which take the place of the grooves A. The housing 110 instead of having the lips 15 and the shoulders 20 is provided with concaved grooves 111 considerably larger than the beads so as to engage over said beads and retain the coupling in position on the pipes. However, the difference between the radii of the beads and the grooves permits expansion and contraction and limited movements of the pipes.

This application is filed as a continuation in part of the joint application filed by James A.

Morgan and Ferd Barnickol, Jr., filed April 20, 1931, under Serial No. 531,319.

The description which has been given, recites more or less detail of a particular embodiment of the invention, which is set forth as new and useful, however, I desire it understood that the invention is not limited to such exact details of construction, because it is manifest that changes and modifications may be made, within the scope of the appended claims, without departing from the spirit of the invention.

Having illustrated and described preferred forms of the invention, what I claim, is:

1. A housing for coupling cylindrical members including, a pair of substantially semi-circular members having cavities therein extending from end to end thereof and provided with a rib and seats on each side of said rib, the ends of said members having their cavity portions flared outwardly, and ears on the ends of the members for securing them together.

2. A coupling for cylindrical members including, an annular housing split diametrically and having an internal annular cavity, a pair of cylindrical members having smooth surfaces inserted in said housing from opposite sides thereof and in contact therewith, a solid elastic gasket surrounding the ends of the cylindrical members within the cavity of the housing, the housing cavity being of greater width than the gasket to provide flow spaces on each side of said gasket, and said gasket having sufficient cubical content to substantially fill said cavity when the housing is fastened together around the cylindrical members, said housing being constructed and arranged to deform and expand the sides of the gasket laterally of said members into said flow spaces and into contact with the side walls of the housing when said housing is fastened together, whereby all outer surfaces of the gasket are held in contact with the walls of the housing and surfaces of said members.

3. A coupling for cylindrical members including, an annular housing split diametrically and having an internal annular cavity, a pair of cylindrical members having smooth surfaces inserted in said housing from opposite sides thereof and in contact therewith, a solid elastic gasket surrounding the ends of the cylindrical members within the cavity of the housing, the housing cavity being of greater width than the gasket to provide flow spaces on each side of said gasket, and said gasket having sufficient cubical content to substantially fill said cavity when the housing is fastened together around the cylindrical members, said housing having an annular rib therein arranged to deform and expand the sides of the gasket laterally of said members into said flow spaces and into contact with the said housing when said housing is fastened together, whereby all outer surfaces of the gasket are held in contact with the walls of the housing and surfaces of said members.

4. A coupling for cylindrical members including, an annular housing split diametrically and having an internal annular cavity, a pair of cylindrical members having smooth surfaces inserted in said housing from opposite sides thereof and in contact therewith, a solid elastic gasket surrounding the ends of the cylindrical members within the cavity of the housing, the housing cavity being of greater width than the gasket to provide flow spaces on each side of said gasket, and said gasket having sufficient cubical content to substantially fill said cavity when the housing is fastened together around the cylindrical members, said housing having an annular rib therein and annular seats on each side of the rib arranged to deform and expand the side portions of the gasket into contact with the side walls of the housing and the cylindrical members when said housing is fastened together, whereby all outer surfaces of the gasket are held in contact with the walls of the housing and surfaces of said members.

5. A coupling for the cylindrical members including, an annular split housing having an internal annular cavity, a pair of members having smooth cylindrical surfaces inserted in the housing from opposite sides thereof, the said members having means for retaining them in the housing and arranged to afford the said members a limited longitudinal movement in said housing, a solid elastic gasket surrounding the ends of said members within the housing and being of less width than said cavity to provide flow spaces and within the cavity on each side of said gasket, the housing having an internal annular rib arranged to engage the outer periphery of said gasket to deform the latter into said flow spaces and to force the inner periphery of said gasket into intimate contact with the surfaces of the said members when the housing is fastened, and means for fastening the housing on said members.

6. A coupling for cylindrical members including, an annular split housing having an internal annular cavity, an elastic annular gasket disposed in the housing cavity and having side walls disposed at angles to the side walls of said housing cavity to provide flow spaces on each side of said gasket, means for fastening the housing together, said housing being arranged and constructed to deform the gasket laterally and inwardly toward the members being coupled, whereby said gasket is distorted into the said flow spaces to form a fluid-tight seal.

7. A gasket for a coupling including, a solid annular elastic body having an annular groove in its inner periphery which is relatively narrow and provided with inclined side walls the inner edge portions of which are cut back to provide annular deforming spaces to compensate flowing of the body material without closing said groove when the gasket is deformed and the groove reduced.

8. An elastic gasket for a coupling for cylindrical members including, a solid annular body having a concaved outer face and an internal annular groove, said body also having beveled shoulders contiguous to its concaved face.

FERD BARNICKOL, Jr.